(12) United States Patent
McBrien et al.

(10) Patent No.: US 6,181,456 B1
(45) Date of Patent: Jan. 30, 2001

(54) METHOD AND APPARATUS FOR STABLE CONTROL OF ELECTROOPTIC DEVICES

(75) Inventors: Gregory J. McBrien, Cromwell; Karl M. Kissa, Simsbury, both of CT (US); Daniel J. Fritz, East Longmeadow, MA (US)

(73) Assignee: Uniphase Telecommunications Products, Inc., Bloomfield, CT (US)

( * ) Notice: Under 35 U.S.C. 154(b), the term of this patent shall be extended for 0 days.

(21) Appl. No.: 09/282,955

(22) Filed: Apr. 1, 1999

(51) Int. Cl.[7] .............................. G02F 1/03; G02F 1/035
(52) U.S. Cl. ................................. 359/245; 385/2
(58) Field of Search ..................... 359/245, 246, 359/315, 316, 173; 385/1, 2, 3

(56) References Cited

U.S. PATENT DOCUMENTS

| | | | |
|---|---|---|---|
| 4,071,751 | 1/1978 | Waksberg | 132/321 |
| 5,724,169 | 3/1998 | LaGasse | 359/173 |

FOREIGN PATENT DOCUMENTS

| | | |
|---|---|---|
| 59-148031A2 | 8/1984 | (JP) . |
| 04029113 | 1/1992 | (JP) . |
| 04337707 | 11/1992 | (JP) . |
| 08248365 | 9/1996 | (JP) . |
| 10333190 | 12/1998 | (JP) . |
| WO 98/14826 | 4/1998 | (WO) . |

OTHER PUBLICATIONS

Lingampalli, Temperature Sensitivity of Lithium Niobate Optical Switches, Jul. 28, 1994.
Product Information Sheet (PIRI) Silica Optical Waveguide Device Single Mode Thermo–Optic Switch Module, Dec. 1, 1997.
Product Information Sheet (PIRI) Silica Optical Waveguide Device Mach–Zehnder Interferometer (MZ) FDM Module, Dec. 1, 1997.

Primary Examiner—Ricky Mack
(74) Attorney, Agent, or Firm—McCormick, Paulding & Huber LLP

(57) ABSTRACT

Method and apparatus are disclosed for the stable control of electrooptic devices, such as for providing a stable bias point for operation of a lithium niobate interferometer-type modulator. The bias point of the modulator is thermally controlled by providing a selected difference in the temperatures of optical waveguide lengths of the interferometer. Heaters can be disposed with the lithium niobate substrate for transferring thermal energy with the optical waveguide lengths. A thermally conductive element can be disposed adjacent the optical waveguide lengths to act as "heat spreaders" to facilitate providing the selected difference in temperature. The invention also includes phase shifters, attenuators, and other optical devices formed from single and multiple optical waveguide lengths propagating separate optical beams.

47 Claims, 11 Drawing Sheets

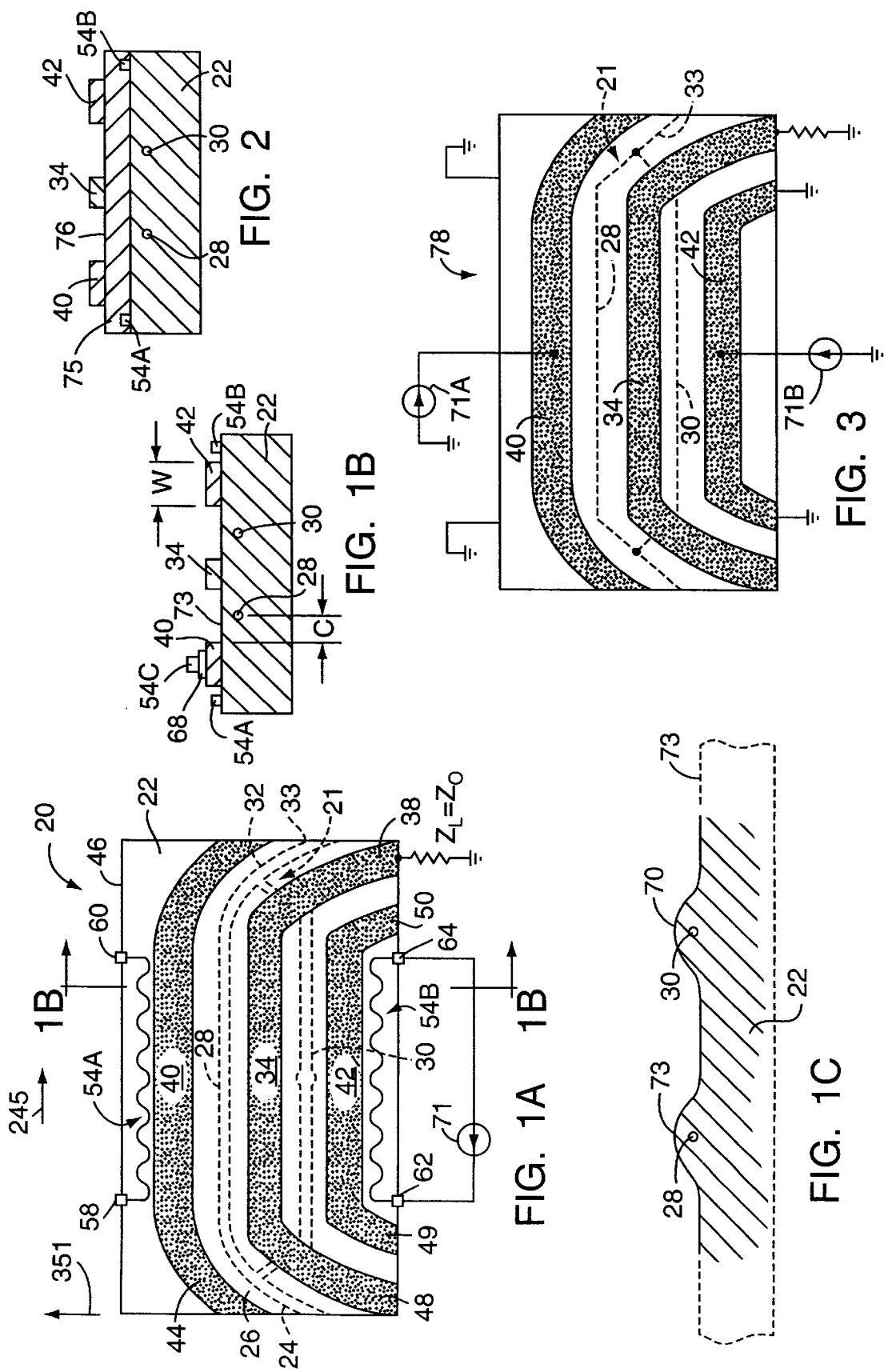

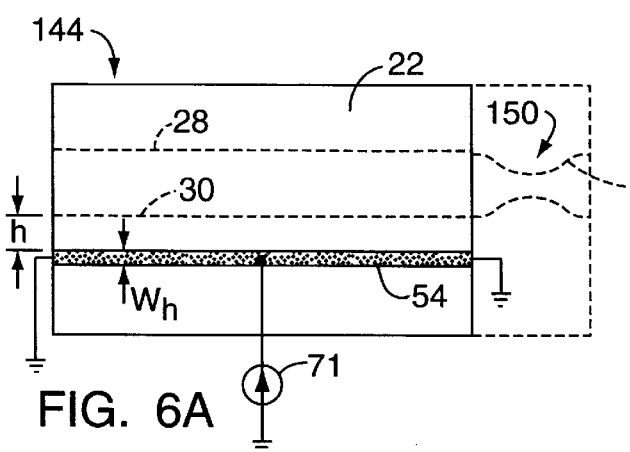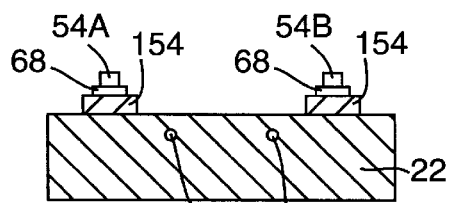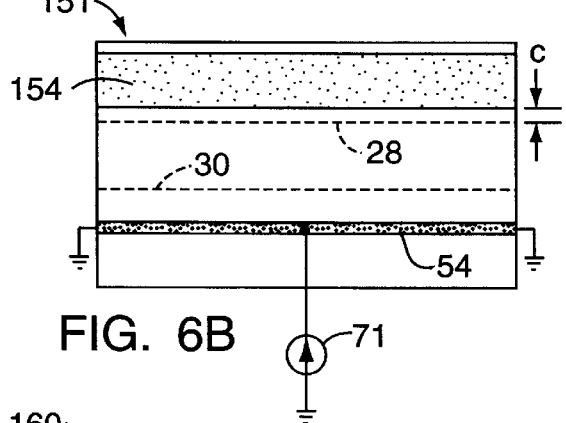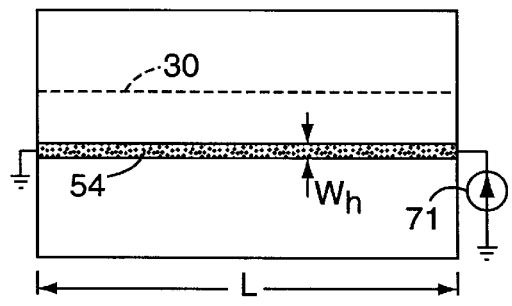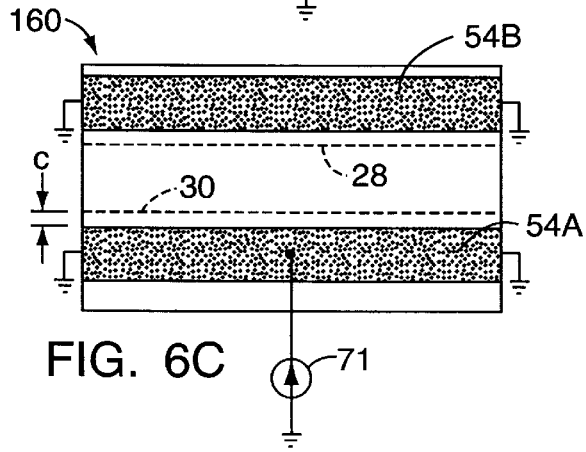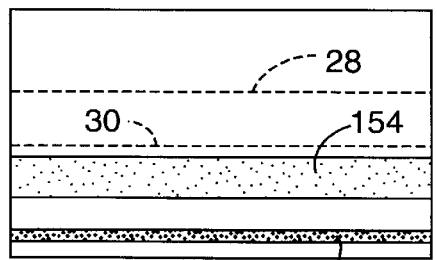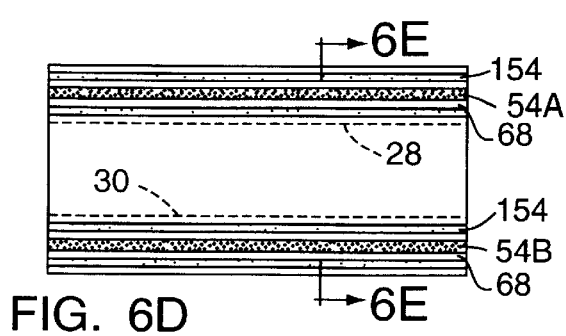

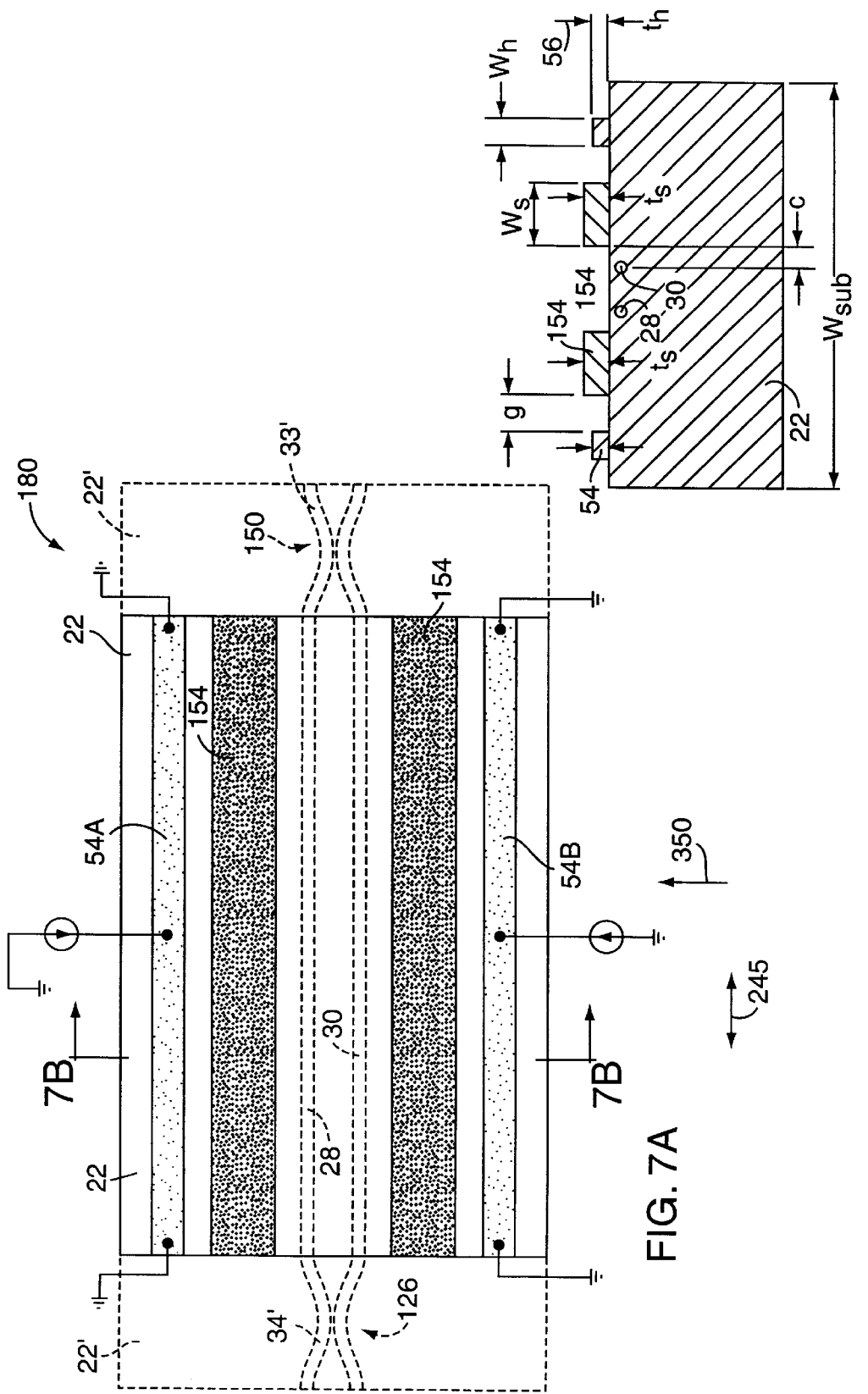

| Heating current, mA | power, mwatts | optical phase, degrees |
|---|---|---|
| 0 | 0.00 | 54 |
| 40 | 0.68 | 53.7 |
| 80 | 1.36 | 52.9 |
| 100 | 1.70 | 52.2 |
| 120 | 2.04 | 52.0 |
| 140 | 2.38 | 50.3 |
| 160 | 2.72 | 49.9 |
| 200 | 3.40 | 47.3 |
| | | |
| | | |

METHOD AND APPARATUS FOR STABLE CONTROL OF ELECTROOPTIC DEVICES

BACKGROUND OF THE INVENTION

Electrooptic materials, such as lithium niobate, are extremely useful in the telecommunications industry for modulating and demodulating signals carried by an optical carrier beam. For example, to modulate an optical beam, an electrode or a multi-electrode structure, such as a coplanar waveguide (CPW) electrode structure, exposes an optical waveguide disposed with an electrooptic substrate to a time-varying (typically RF) electric field. The RF field varies the index of refraction of the electrooptic material of the optical waveguide, changing the phase of the beam propagating along the waveguide, thus modulating the beam. As is known in the art, it is often advantageous to arrange such a modulator as an interferometer wherein the CPW electrode structure applies the RF electric field to two optical waveguide lengths in a "push-pull" fashion. Beams propagating along the two optical waveguide lengths are combined to interfere to produce a single optical output. Techniques known in the art for forming optical waveguides with electrooptic substrates include titanium indiffusion and an annealed proton exchange (APE™) technique.

Devices such as modulators and detectors are typically operated at a selected bias point. As is understood by those of ordinary skill in the art, depending on the circumstances and device configurations, a bias point can be selected such that the device operates within a particular linear range, at a minimal zero throughput, or at a half power point of optical output.

According to the prior art, electrooptic devices are typically biased by attempting to apply a known constant electric field to the optical waveguide(s) formed in or on the electrooptic substrate, such as by applying a fixed d.c. bias voltage to an appropriately located bias electrode. In some instances, the bias voltage can be applied to the some or all of the electrodes that apply the RF fields. Unfortunately, voltage biasing techniques must deal with the pheonomenon of bias drift. Although a constant voltage is applied to the biasing electrode, the actual electric field applied to the electrooptic optical waveguide varies, and the bias point of the device drifts. Physical impurities, crystal defects, and any causes of both trapped and mobile charges are considered to affect the bias stability of the device. In addition, because the optical waveguides are typically located near the surface of the electrooptic substrate, the crystal composition near the surface affects drift of the bias point via a variety of surface chemistry mechanisms. Even the method used for fabricating the waveguides, often involving indiffusion or proton exchange processes, can affect bias point drift, because these techniques modify the crystal structure. Bias point drift is a known problem and extensively discussed in the technical literature, particularly regarding lithium niobate, the most common electrooptic material used for optical devices.

In one approach to countering bias drift in interferometer-type modulators, the d.c. voltage is not fixed. A feedback circuit monitors the bias point, i.e. the phase or intensity of the output beam, and adjusts the bias voltage applied to the modulator. However, the voltage available for bias is typically limited, for example, to the "rail" voltage of 15 volts. It is possible that a feedback circuit, in tracking and correcting for drift, could "hit the rail," that is, apply the full 15 volts, and to correct the drift will decrease the voltage by some step, essentially going to the next "fringe" of the interferometer. Such a "reset" is considered undesirable as it can result in lost data. Reset can usually be avoided by proper design, but it remains a concern, and compensating for the possibility of reset can complicate the biasing circuit design.

In some instances the optical devices can be manufactured to operate at a selected bias point. For example, the two optical waveguide lengths of an interferometer device can be fabricated having different physical lengths to introduce a selected phase difference between beams propagating along the lengths. This technique is effective and can increase cost, but may be limited to use in a specific application.

Accordingly, it is an object of the present invention to overcome one or more or the aforementioned drawbacks and disadvantages of the prior art.

This and other objects of the invention will in part appear hereinafter and in part be apparent to one of ordinary skill in light of the disclosure herein.

SUMMARY OF THE INVENTION

According to the invention the phase and/or the magnitude of an optical beam propagating along an optical waveguide length of an electrooptic device can be selected by controlling the temperature of the optical waveguide length. The selected phase or magnitude is stable and substantially drift free. The temperature of the optical waveguide length can be controlled via a heater for transferring thermal energy to the optical waveguide length. The heater can be disposed with a substrate with which the optical waveguide lengths are disposed. Advantageously, the present invention can be practiced simply and economically.

According to one aspect of the invention, an optical modulator includes an electrooptic substrate; an optical waveguide interferometer disposed with the electrooptic substrate and including first and second optical waveguide lengths for propagating beams for interfering to form an output beam; an electrode structure disposed with the substrate and having a center electrode and first and second ground electrodes, the electrode structure for exposing the optical waveguide lengths to time-varying electric fields produced between the center and ground electrodes for modulating the output beam; and means for providing a selected temperature difference between the temperature of at least a portion of the first optical waveguide length and the temperature of at least a portion of the second optical waveguide length for providing a selected bias point for operation of the modulator.

In another aspect, there is provided according to the invention an optical device that includes an electrooptic substrate having first and second optical waveguide lengths disposed with said substrate, said optical waveguide lengths for propagating first and second beams. Also provided are means for asymmetrically transferring thermal energy with said first and second optical waveguide lengths for providing a selected difference in temperature between at least a portion of said first waveguide length and a portion of said second waveguide length for providing one of a selected phase difference and a selected intensity difference between the first and second beams. A thermally conductive element can be disposed with the substrate and adjacent an optical waveguide length for facilitating the provision of the selected temperature difference. The thermally conductive element 154 acts as a "heat spreader" to enhance the difference in temperature between the optical waveguide lengths.

In yet a further aspect, there is provided in accordance with invention an electrooptic optical device for providing stable control of the phase or intensity of an optical beam. The electrooptic optical device includes an electrooptic substrate; a waveguide length disposed with the substrate and for propagating the optical beam; and means for transferring thermal energy with the optical waveguide length for heating or cooling the waveguide length for varying the phase or intensity of an optical beam propagating along the optical waveguide length. The phase and intensity are substantially drift free as compared with control of the phase or intensity of the beam via a fixed d.c. voltage control approach.

The invention also includes methods practiced in accordance with the disclosure herein.

According to one feature, the invention includes a method of biasing an electrooptic modulator to have a selected phase or intensity. The electrooptic modulator includes at least first and second optical waveguide lengths disposed with an electrooptic substrate for propagating light beams for interference to form the output beam. The method includes the steps of: selecting a bias point for operation of the modulator; selecting a temperature difference to achieve the selected bias point; and providing approximately the selected difference between the temperature of at least a portion of the first optical waveguide length and the temperature of at least a portion of the second optical waveguide length to achieve the selected bias point.

According to another feature, the invention includes a method for providing stable control of an optical beam propagating along an optical waveguide length. The method includes the steps of: selecting one of the desired phase and the desired intensity of the optical beam; selecting a temperature to achieve the selected one of the phase and the intensity; and transferring thermal energy with said optical waveguide length for maintaining the optical waveguide length at approximately the selected temperature, whereby the selected one of the phase and the intensity is substantially drift free.

Other features and aspects of the present invention are provided below.

BRIEF DESCRIPTION OF THE DRAWINGS

For a more complete understanding of the invention, reference is made to be made to the following Detailed Description of the Preferred Embodiments and the accompanying drawings, in which:

FIG. 1A illustrates one embodiment of an optical modulator according to the invention.

FIG. 1B is a cross section taken along section line 1B—1B of the optical modulator of FIG. 1A.

FIG. 1C illustrates the optical modulator of FIG. 1A wherein the optical waveguide lengths are present in raised areas of the surface of the electrooptic substrate.

FIG. 2 illustrates a preferred location of the heater electrodes of the present invention when layers are disposed with the electrooptic substrate.

FIG. 3 illustrates an alternative embodiment of a modulator according to the invention including a current supply for supplying a heating current to a CPW electrode for heating the optical waveguides.

FIG. 4 also illustrates a steering circuit for preferentially applying power to heater electrodes.

FIG. 6A illustrates apparatus according to the invention wherein a planar rectangular heater electrode is disposed with an electrooptic substrate having first and second optical waveguide lengths.

FIG. 6B illustrates the apparatus of FIG. 6A further including a thermally conductive element 154 disposed with the electrooptic substrate for functioning as a "heat spreader" to enhance the difference in the temperature of the first and second optical waveguide lengths.

FIG. 6C illustrates apparatus according to the invention having first and second optical waveguides lengths formed within the substrate and first and second heater electrodes adapted for functioning as heat spreading thermally conductive elements 154.

FIG. 6D illustrates apparatus according to the invention including first and second optical waveguide lengths, and first and second heater electrodes disposed with first and second thermally conductive elements 154, respectively.

FIG. 6E is a cross section of the apparatus of FIG. 6D taken along the section line 6E—6E.

FIG. 6F illustrates an apparatus according to the invention and including an optical waveguide length disposed with a single heater for varying the phase or magnitude of a beam propagating the optical waveguide length.

FIG. 6G illustrates apparatus according to the invention and including first and second optical waveguide lengths disposed with a heater and a thermally conductive element.

DETAILED DESCRIPTION OF THE PREFERRED EMBODIMENTS

Figure 4:
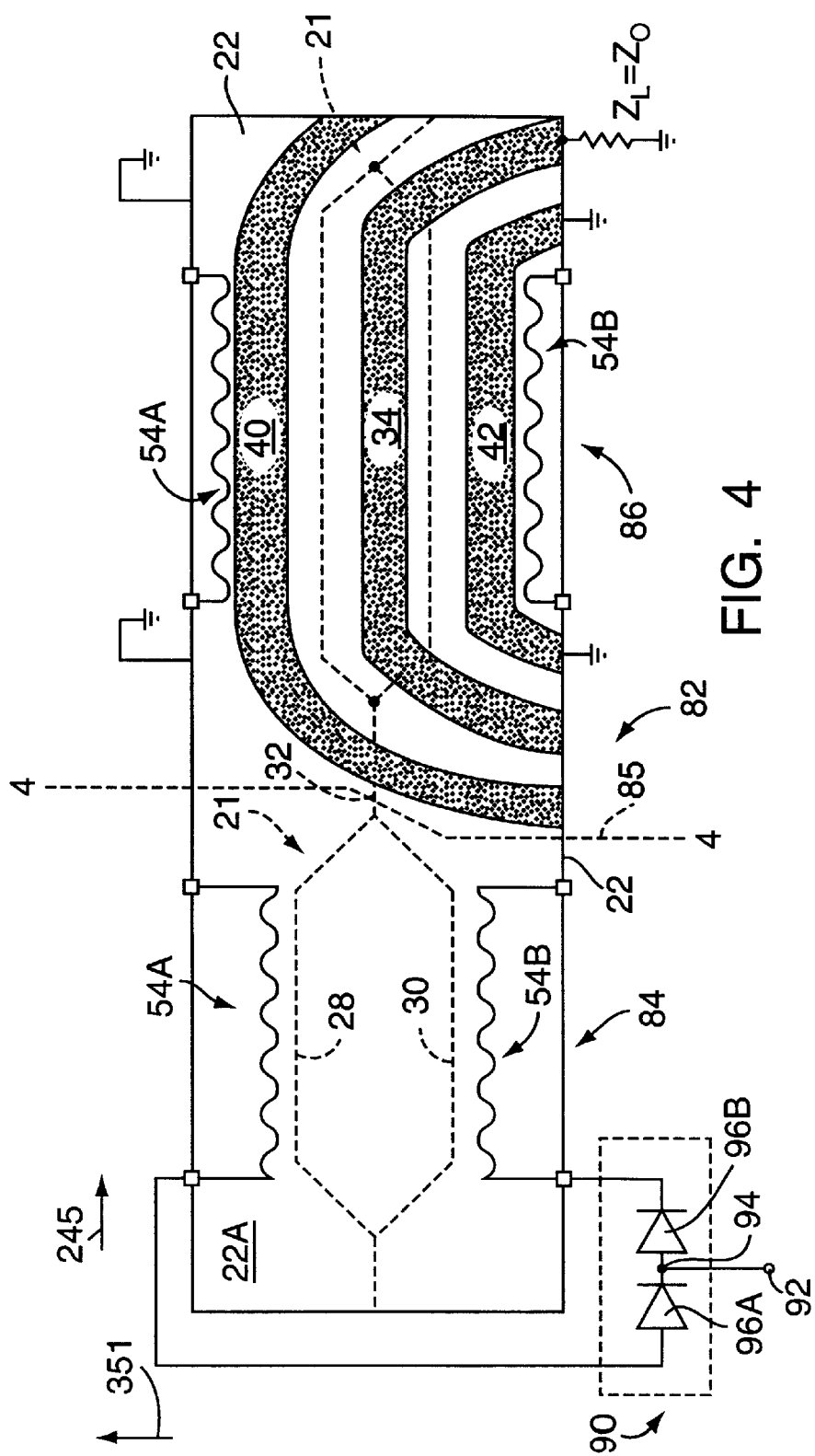
FIG. 4 illustrates another embodiment of the invention including a thermooptic device optically coupled with a modulator.

FIGURES 1A–1C illustrate one embodiment an optical modulator 20 having improved bias point control. The optical modulator 20 includes an optical waveguide interferometer structure 21 formed within an electrooptic substrate 22, such as a lithium niobate substrate. The optical waveguide interferometer structure 21 includes an input optical waveguide length 24, an input branch junction 26 for splitting the input optical waveguide length 24 into two independent optical waveguide lengths 28 and 30, an output branch junction 32 for interfering the light beams propagating along the lengths 28 and 30, and an output waveguide length 33 for propagating the output beam. As understood by one of ordinary skill in the art, the branch junctions 26 and 32 can be optical couplers, rather than the "Y" junctions shown in FIG. 1A. The optical waveguide interferometer structure 21 is formed within the substrate 22. Accordingly, as illustrated in FIG. 1B, which is a cross section of FIG. 1A taken along the section line 1B—1B, the optical waveguide lengths 28 and 30 are below the surface 73 of the substrate 22.

The optical modulator 20 includes a coplanar waveguide (CPW) electrode structure disposed with the substrate. The CPW structure includes a center electrode 34 having an input 48 and an output 38 and upper and lower ground electrodes, 40 and 42, respectively. As is known in the art, a time-varying signal applied between the input 48 of the center electrode 34 and ground exposes the optical waveguide lengths 28 and 30 to electric fields developed between the CPW center electrode 34 and the upper and lower ground electrodes 40 and 42. The time-varying electric fields vary the index of refraction of the electrooptic material forming the optical waveguides in a "push-pull" fashion, such that the output beam propagating on the output waveguide length 33 is modulated by the time varying signal, which is typically an "RF" signal. The ground electrode inputs 44 and 49 and outputs 46 and 50 are typically provided with an RF ground.

According to the invention, at least the upper heater electrode 54A or the lower heater electrode 54B is disposed with the substrate 22. Each of the heater electrodes 54A and 54B is located asymmetrically with respect to the optical waveguide lengths 28 and 30, thereby asymmetrically transferring heat with the optical waveguide length for providing a selected difference in the temperature thereof. As used herein, the term "heater electrode" refers to an electrode for conducting electricity to dissipate electrical energy as heat.

Typically, one of the heater electrodes is operated at a time. For example, the current supply 71 provides the heater electrode 54B with a selected current, causing the optical waveguide length 30 to be warmer that the length 28, creating a differential between the index of refraction of the optical wavelength 30 and the optical waveguide length 28, and hence a difference in between the optical path lengths of the optical waveguide lengths 28 and 30. A differential phase shift between beams propagating along the lengths 28 and 30 results, modifying the combined beam formed by the interference of the beams propagating along the lengths 28 and 30 at the output junction 32. Operation of the heater electrode 54A (typically without operation of the heater electrode 54B) causes the optical waveguide length 28 to be warmer than the length 30, causing an opposite differential phase shift in the phase of a beam propagating along the optical lengths of waveguide 28 and 30. The heater electrode and the current provided thereto are selected to provide a selected differential phase shift, and hence a selected bias point for operation of the modulator 20.

The current supply 71 may be switched to supply current to the upper heater electrode 54A, or a separate supply can be provided for the heater electrode 54A. Note that although optical waveguide structure 21 is formed within the electrooptic substrate, the surface of the substrate 73 need not be flat. The surface 73 can be selectively etched such that the optical waveguide structure 21 or portions thereof is formed in raised areas of the electrooptic substrate 22, as shown in FIG. 1C, illustrating in cross section the optical waveguide lengths 28 and 30 formed in raised areas 70.

Optionally, the heater electrodes can be fabricated on the CPW ground electrodes, as shown in FIG. 1B wherein the heater electrode 54C is disposed with the upper ground electrode 40. A thermally conductive electrical insulator layer 68 separates the heater electrode 54C from the upper ground electrode 40.

As is known in the art, various layers of different materials are often deposited when fabricating electronic and optical devices that are based on a particular substrate. For example, an intermediate layer may be deposited on the surface of a substrate to provide a buffer to an upper layer subsequently deposited on the intermediate layer. Thus, for example, an electrode may not be deposited directly on the surface 73 of the substrate 22, but nevertheless be attached to the substrate via an intermediate layer(s). The term "disposed with", as used herein, refers to structures or elements that are directly deposited on and adhere to the substrate, are attached to the substrate via intervening layers or structures, or are formed within the substrate 22, such as the optical waveguide interferometer 21.

Should an intervening layer be used between the electrooptic substrate 22 and the CPW structure shown in FIG. 1, such as the silicon dioxide layer 75 in FIG. 2, it is preferable that the heater electrodes 54A and 54B be adjacent the electrooptic substrate, as illustrated in FIG. 2, for facilitating heat transfer thereto. However, locating the heating electrode on the top surface 76 of the layer 75, rather than as illustrated in FIG. 2, is considered within the scope of the invention, as is a heater that is separate from the electrooptic substrate 22. The silicon dioxide layer 75 is often employed with "Z cut" substrates 22, wherein the z axis of the electrooptic substrate is perpendicular to the plane of the surface of the electrooptic substrate 22, and hence to the direction of propagation of light. The invention is deemed useful in orientations other than Z cut, for example, with X cut substrates, and any interveaning layer need not be the silicon dioxide layer 75. For example, see U.S. patent application Ser. No. 08/683,870, filed Jul. 19, 1997 and entitled "Velocity Matched Traveling Wave Electro Optical Modulator," herein incorporated by reference.

FIG. 3 illustrates an alternative embodiment of the invention 78 wherein the current supply 71 passes current through the upper CPW ground electrode 40 (or alternatively, the lower CPW ground electrode 42) for heating the ground electrode 40 and the substrate 22. Because the ground electrode 40 is asymmetrically located relative to the optical waveguide lengths 28 and 30, thermal energy is transferred asymmetrically to the optical waveguide lengths 28 and 30 for providing a selected difference in the temperature of the optical waveguide lengths. A bias point for operation of the modulator is thus selected. Similarly, the current source 71B can provide current to the lower CPW ground electrode 42. As understood by one of ordinary skill in the art, although two current sources are shown in FIG. 3, one current supply can be used and simply switched between electrical connection with the upper and lower ground electrodes 40 and 42, respectively. The upper and lower ground electrodes 40 and 42 thus serve as heater electrodes, in addition to performing their RF duties as the ground electrodes 40 and 42.

FIG. 4 illustrates another embodiment 82 of the invention including a thermooptic signal conditioning device 84 to the left of the dotted line 85 in optical communication with a modulator 86 to the right of the dotted line 85, both disposed with the electrooptic substrate 22. The thermooptic device 84 includes an interferometer waveguide structure 21 and upper and lower heater electrodes, 54A and 54B, respectively. The modulator 86 also includes a optical waveguide interferometer structure 21 and a CPW electrode structure having a center electrode 34 and upper and lower ground electrodes 40 and 42, and heater electrodes 54A and 54B. The thermooptic device 84 can function as a phase shifter and/or an attenuator, depending on the sum and difference of the phase shifts introduced to the beams propagating along optical waveguide lengths 28 and 30 via the selective heating of the heater electrodes 54A and 54B. The device 86 functions as a modulator having a thermally controlled bias point for modulating a phase shifted and/or attenuated optical beam received from the thermooptic device 84. In conjunction the two form a versatile and useful monolithic optical modulation device 82 having enhanced intensity and/or phase control.

According to yet another embodiment of the invention, the device 84 is fabricated alone, that is, disposed with an electrooptic substrate 22A that does not include the half 22B of the substrate 22 to the right of the dotted line 85.

Also shown in FIG. 4 is a steering circuit 90 for steering heating current to the upper and lower heater electrodes, 54A and 54B, respectively, based on the polarity of the d.c. voltage applied to the steering circuit input 92. Non-reciprocal devices 96A and 96B (e.g., diodes) are in series between the upper heater electrode 54A and the lower heater electrode 54B of the thermooptic device 84. A positive voltage applied to the steering circuit input 92 is applied to junction 94, forward biasing the non-reciprocal device 96B and reverse biasing the non-reciprocal device 96A such that current is passed to the lower heater electrode 54B. A negative voltage has the opposite effect, passing current to the upper heater electrode. The voltage corresponding to the heater current thus determines which heater electrode receives the heater current. The steering circuit can be used in conjunction any of the optical devices having more than one heater electrode, including the optical modulator 21 shown in FIGURES 1A–1C, as well as with the modulation device 86 shown in FIG. 4.

Figure 5A:
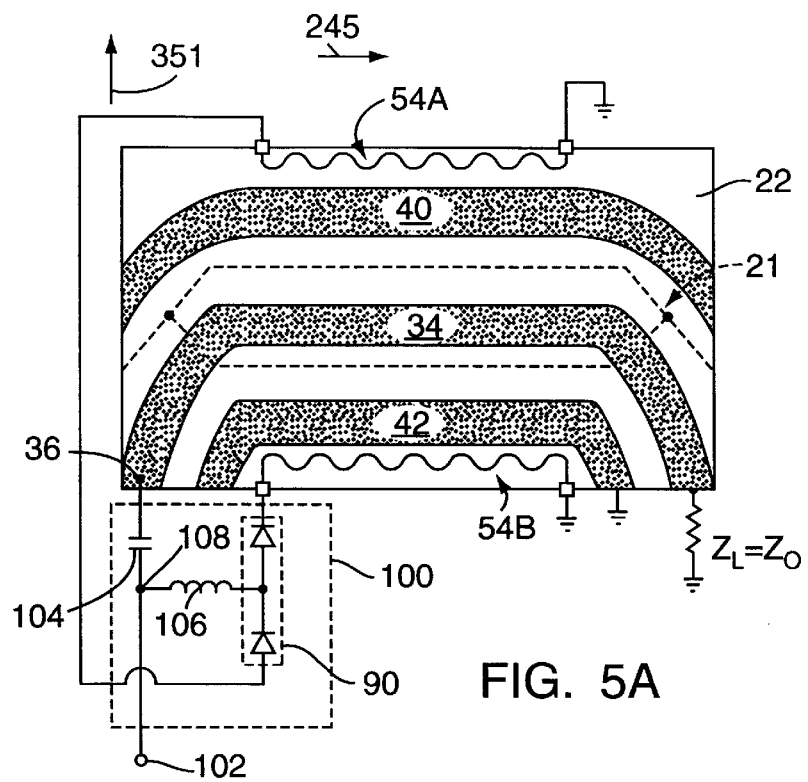
FIG. 5A illustrates a modulator according to the invention including a circuit for providing a single input for the RF modulation signal and for the bias current, the circuit including a steering circuit for steering bias current to the heater electrodes based on the polarity of the voltage corresponding to the heater current.

FIG. 5A illustrates a combined input circuit 100 for providing a single input 102 for receiving the RF modulation signal and the heating current for supply to the heater electrodes 54A and 54B for biasing the modulator. The combined input circuit includes a capacitor 104 for passing RF frequencies to the input 36 of the center electrode 34 of the CPW electrode structure, and for blocking heating current from reaching the center electrode 34. The inductor 106 passes heating current (and tends to block the RF) to the steering circuit 90 which steers heating current to the upper and lower heater electrodes based on the polarity of the heating signal, as described above.

Figure 5B:
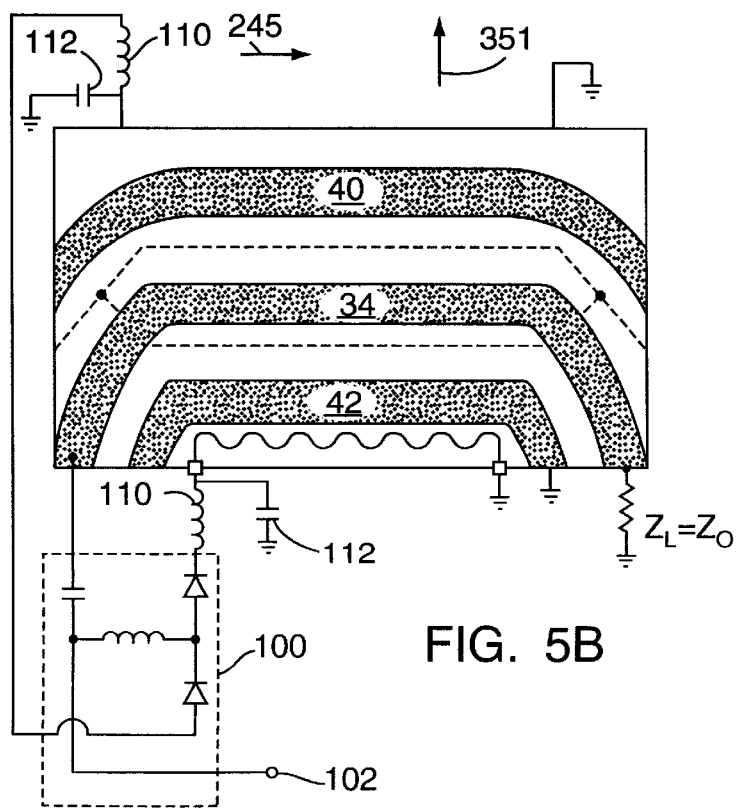
FIG. 5B illustrates a modulator according to the invention including a combined input circuit for providing a single input for the RF modulation signal and for heater current, the circuit including a steering circuit for steering heater current to the ground electrodes of a CPW electrode structure based on the polarity of voltage corresponding to the heater current.

In FIG. 5B, the CPW ground electrodes are used to asymmetrically transfer thermal energy with the optical waveguide lengths 28 and 30 for biasing the modulator. The capacitors 112 provide RF grounds for the upper and lower CPW ground electrodes, and the inductors 110 isolate any RF from any heating current.

Further embodiments of the invention are shown in FIGS. 6A–6E.

FIG. 6A shows an embodiment of the invention 144 wherein the heater electrode 54 disposed with the electrooptic substrate 22 asymmetrically transfers thermal energy with the optical waveguide lengths 28 and 30 formed within the substrate 22 for shifting the phase of an optical beam propagating on one of the optical waveguide lengths 28 and 30 relative to the beam propagating on the other. The apparatus 144 can be useful as a phase shifter in a phased array antenna, which is steered electronically by varying the phase of the signals provided to the antenna elements. In this application, the optical path lengths 28 and 30 are each coupled to a separate antenna element. Although two optical waveguide lengths and one heater electrode are shown in FIG. 6A, more can be used.

Alternatively, in other applications, the beams propagating on the optical waveguide lengths 28 and 30 can be combined, such as by the optical coupler 150, to produce a combined optical beam propagating along the output optical path length 33. The apparatus 144 including the optical coupler 150 can be useful in several applications, including attenuation and phase shifting of signals.

Figure 8:
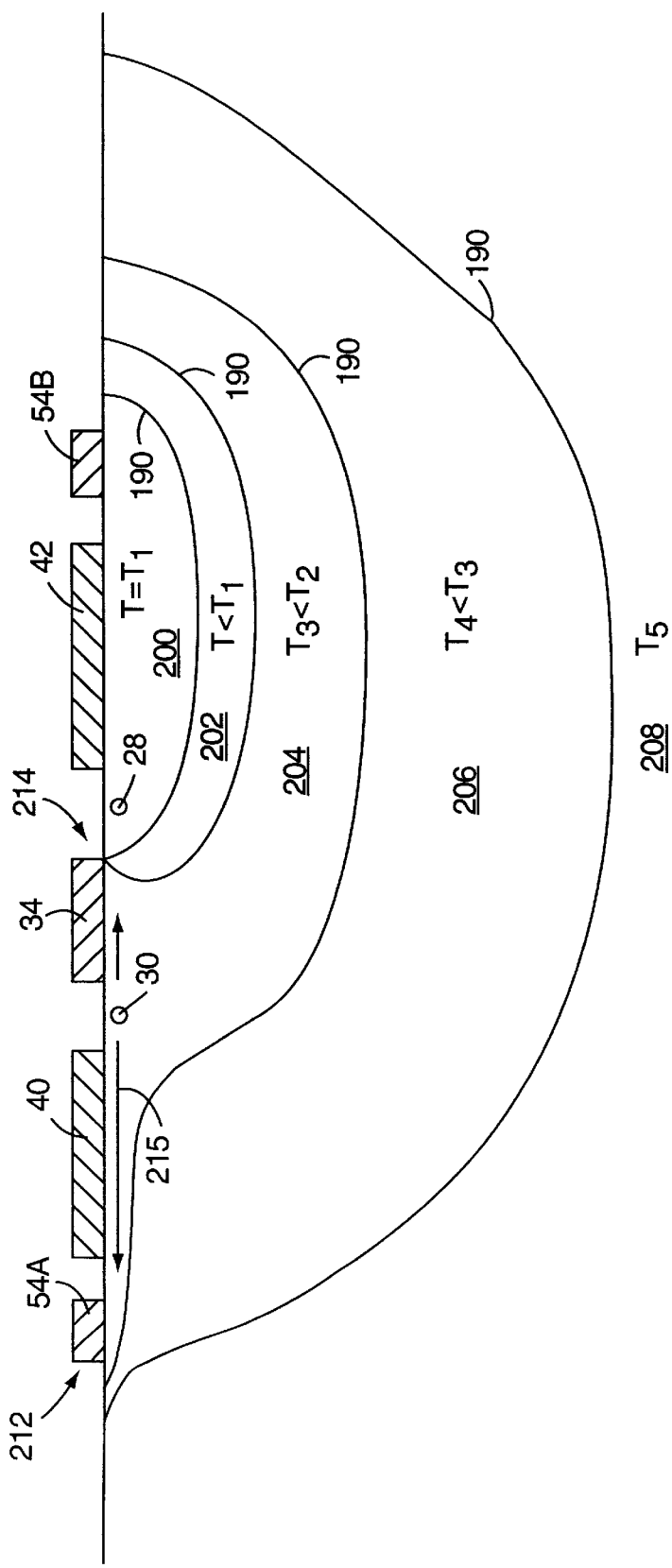
FIG. 8 is a finite element plot illustrating isotherms showing how the thermally conductive element 154 enhances the difference in temperature between optical waveguide lengths formed within an electrooptic substrate.

FIG. 6B illustrates an alternative embodiment of the invention 151 including a thermally conductive element 154 disposed with the electrooptic substrate for enhancing the difference in temperature between the optical waveguide lengths 28 and 30. In the embodiment illustrated in FIG. 6B, the thermally conductive element 154 is a planar strip of a metal that functions as a "heat spreader," enhancing the difference in the temperatures of the lengths for a given thermal input from the heater electrode. The results of a finite element analysis of the operation of the thermally conductive element 154 is shown in FIG. 8, and is discussed in more detail below. The thermally conductive element 154 is preferably a good thermal conductor, and the heater electrode 54 preferably has sufficient resistance to generate enough thermal energy, based on the current in the heater electrode, to transfer sufficient thermal energy with the optical waveguide lengths for producing the desired phase shift between the beams propagating on the optical waveguide lengths.

Typically, good thermal conductors have low electrical resistance. However, according to the invention, it is disclosed that heater electrodes can be fabricated, such as the heater electrodes 54A and 54B in the embodiment of the invention 160, shown in FIG. 6C, that can function effectively both as a heater and a heat spreading thermally conductive element 154. The heater electrodes 54A and 54B in FIG. 6C are preferably formed of a material having a high thermal conductivity, yet that are relatively resistive. A gold heater electrode has been found to be acceptable in certain applications.

FIGS. 6D and 6E illustrate an alternative embodiment wherein heater electrodes 54A and 54B are disposed with the thermally conductive elements 154. FIG. 6E is a cross section of FIG. 6D taken along the section line 6E—6E. The heater electrodes 54 can then be a highly resistive material, such as chrome, titanium or nichrome, and are separated from the thermally conductive elements 154 by electrical insulating layers 68.

In the embodiments illustrated in FIGS. 6A–G, the heater electrode 54 is illustrated as a strip heater electrode, having a width $w_h$, and can be, for example, a gold, chrome, or titanium layer (or a combination of gold, chrome, nichrome and titanium layers) disposed with the electrooptic substrate 22. The current supply 71 drives current through the heater electrode 54.

Note that the nominal physical lengths or the optical path lengths of the optical waveguide lengths 28 and 30 need not be the same, that is, a difference therebetween when the waveguide are at equal temperatures can be part of a particular design. Asymmetrically transferring thermal energy with optical path lengths then can reduce or increase the nominal phase difference between beams traveling on the optical path lengths 28 and 30.

As illustrated in FIG. 6F, the heater electrode 54 can be disposed with a single optical waveguide length 30 formed in the electrooptic substrate 22 for varying the index of refraction of the optical waveguide length 30, and hence the phase of a beam propagating along the length 30.

Furthermore, according to the invention it is disclosed that heating of a optical waveguide formed in an electrooptic substrate can produce a useful and stable change in the index of refraction of the waveguide with reasonable currents (i.e. in the milliamp range) and with voltages typically available in practical optical systems (i.e., typically 15 volts or less) and with heater electrodes that can be easily fabricated. More particularly, it is also disclosed that stable and useful changes are induced in the optical path length 30 by a heater electrode fabricated from a material having rather low resistivity (i.e. gold) and that has a thickness that produces a resistance per square that typically indicates an acceptable surface resistance for the propagation of RF signals, e.g., a gold strip having a thickness in the range of a few microns.

Thus, in certain embodiments of the invention, conductors already present in a device and used for RF modulation signals can perform, or can be adapted to perform, the additional function of a heater electrode for inducing a stable phase shift or a stable bias point. Voltage biasing can be avoided and components reduced (a separate voltage electrode is often employed for voltage biasing). The function of biasing is significantly improved and voltage biasing electrodes eliminated.

Furthermore, according to the invention, it is disclosed that the heater electrodes can achieve useful heating of the optical path length 30 at separation distances d from the optical path length that do not significantly interfere with the propagation of an optical beam along the optical waveguide length 30.

FIGS. 7A and 7B illustrate one embodiment of the invention 180 including separate thermally conductive elements 154 and heater electrodes 54 for producing a selected difference in the temperature of the optical waveguide lengths 28 and 30, and hence in the phase difference between optical beams propagating the lengths 28 and 30. The embodiment shown in FIGS. 7A and 7B is similar to that of FIG. 6B, except that two thermally conductive elements 154 and two heater electrodes are shown in FIG. 7. FIG. 7B is a cross section of FIG. 7A taken along the section line 7B—7B of FIG. 7A. The apparatus 180 shown in FIGS. 7A and 7B can be useful in number of applications, such as when monolithically integrated with input and output optical couplers 126 and 150 to form a tunable phase shifter or attenuator having input and output waveguide lengths 34' and 33' respectively. The couplers 126 and 150 are shown in the within the dotted lines indicating that the substrate 22 can optionally include the portions 22'.

Figure 7C:
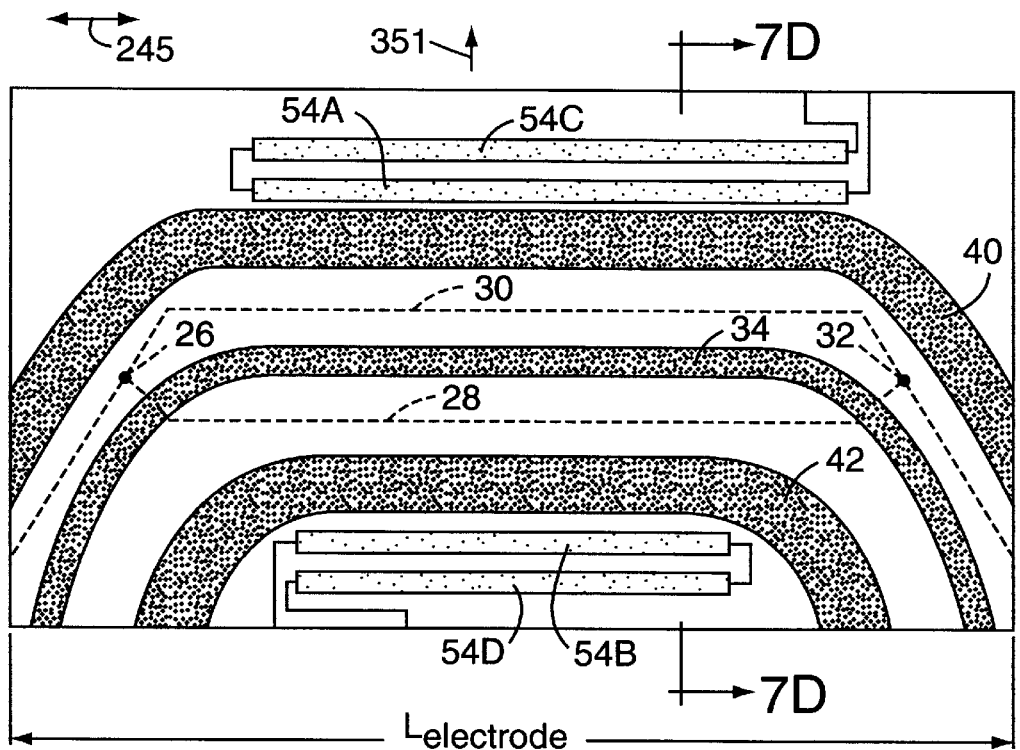
FIG. 7 illustrates another embodiment of an apparatus according to the present invention.
Figure 7D:
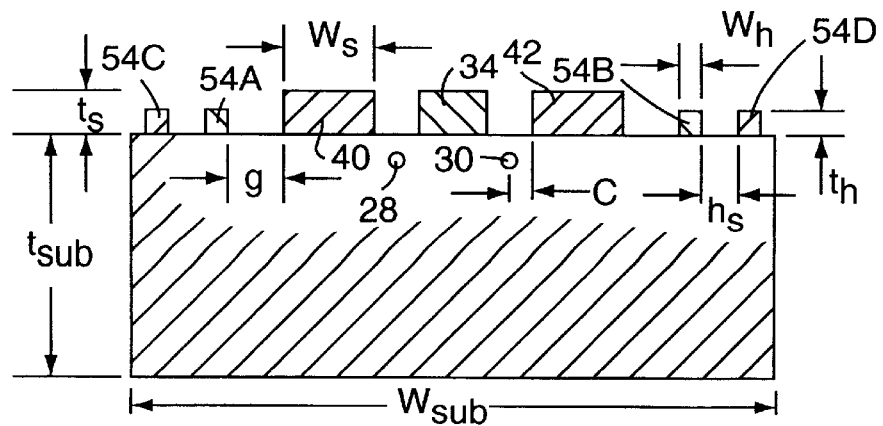

FIGS. 7C and 7D illustrate a preferred embodiment of a interferometer-type modulator according to the invention. FIG. 7D is a cross section of FIG. 7C taken along the section line 7D—7D shown in FIG. 7C. Provided in FIG. 7C and FIG. 7D are four strip heater electrodes 54A, 54B, 54C and 54D. The upper and lower CPW ground electrodes 40 and 50, respectively, shown in FIGS. 7C and 7D can perform both as CPW ground electrodes and as thermally conductive elements 154 for increasing the temperature difference between the optical waveguide length 28 and the optical waveguide length 30.

Preferably the CPW ground electrodes 40 and 42 are gold and have a thickness $t_h$ of at least approximately 5 microns. The heater electrodes 54 are preferably a material more resistive that gold, such as titanium, chromium or nichrome. Chromium is preferred over titanium, as titanium can oxidize and hence its properties can change with age. Preferably, the heater electrodes 54 have a thickness th that is less than approximately 1 micron thick; more preferably, the heater electrodes are less than approximately 5000 Angstroms thick, and most preferably the heater electrodes are between approximately 2000 Angstroms and approximately 1000 Angstroms thick.

As is understood by one of ordinary skill in the art, the resistance of a particular length of a material depends on the length, width, thickness and resistivity of the material. Preferably, the above dimensions of the heater electrodes 54 are selected such that each of the heater electrodes has a resistance of approximately 300 to approximately 2000 Ohms; more preferably, the dimensions are selected such that the heater electrodes each have a resistance of between approximately 500 and approximately 1000 Ohms; most preferably, the heater electrodes each have a resistance of between approximately 700 and approximately 800 Ohms. The width of the heater electrodes (shown as $W_h$ in the accompanying FIGURES) can be selected to achieve the desired resistance in conjunction with the other heater electrode parameters. However, with reference to FIGS. 6 and 7, it is considered desirable that the heater electrode act as a "line" thermal source. Accordingly, it is preferable that the heater electrodes have a width $W_h$ less than approximately 100 microns; more preferably, the heater electrodes have a width that is less than approximately 50 microns; and most preferably, the heater electrodes have a width that is between approximately 5 and approximately 10 microns.

It is desirable that a thermally conductive element 154 be as close to the optical waveguide length it is to affect. Preferably, the distance "c" is less than approximately 20 microns; more preferably the distance is less than approximately 10 microns; and most preferably, the distance is less than approximately 5 microns. Similarly, the gap "g" between a heater electrode 54 and an adjacent heat spreader 154 should be as narrow as possible.

Preferably, g is less than approximately 20 microns; more preferably, the distance is less than approximately 10 microns; and most preferably, the distance is less than approximately 5 microns. When heater electrodes are placed adjacent each other, such heater electrodes 54A and 54D shown in FIG. 7D, it is preferred that the heater electrode to heater electrode spacing ($h_s$ in FIG. 7) be about 10 microns.

Optical devices are typically required to function over a range of ambient temperatures. Heat transfer from a device to the ambient environment, is, of course, a function of temperature difference between the device and the ambient temperature, and also of the dimensions of device. To promote independence of the operative effect of the heater electrodes of the invention from variations in the ambient temperature, it is preferable that the substrate have a width $W_{sub}$ greater than approximately 1 mm and have a thickness $t_{sub}$ greater than approximately 0.25 mm; more preferably the width of the substrate is greater than 1 mm and the substrate is greater than 0.5 mm thick; and most preferably, the width of the substrate is greater than approximately 1.5 mm and the substrate is greater than approximately 1 mm thick. A typical electrode length, $L_{electrode}$, is about 10 to 20 mm. A width $W_s$ for the thermally conductive elements 154 of 50 microns has been found to be effective. As is understood from the foregoing discussion, this dimension applies also to the width of the coplanar waveguide ground electrodes shown in FIGS. 7C and 7D, though increasing the width of the coplanar waveguide ground electrodes, such as to 200 microns, results in only a marginal loss of efficiency as defined by phase change per milliwatt of heat.

FIG. 8 is a plot generated from a finite element analysis and illustrates the effect of the thermally conductive element, in this instance the ground electrode 42, on the temperature gradient between first and second waveguide lengths 28 and 30 formed within a lithium niobate substrate. Heater electrodes 54A and 54B are disposed adjacent to a coplanar waveguide electrode structure having a center electrode 34 and ground electrodes 40 and 42. In FIG. 8, heater electrode 54B is passing current for asymmetrically transferring thermal energy with the optical waveguide lengths 28 and 30; the heater electrode 54A is not being heated. Isotherms 190 separate temperature regions 200, 202, 204, 206 and 208, with region 200 having a higher temperature than region 202; region 202 having a higher temperature than region 204, etc.

The ground electrodes 40 and 42 act as thermally conductive elements, either carrying heat from a heater strip to a waveguide or by carrying heat away from a waveguide on the unheated side. For example, ground electrode 40 creates the widened portion, indicated by reference numeral 215, of the temperature region 204, such that the optical waveguide length 30 falls within the temperature region 204, rather that the higher temperature region 202. The difference in the temperatures of the optical waveguide lengths 28 and 30 is thus enhanced by the presence of the thermally conductive element 154 ( i.e., in the illustration of FIG. 8, the ground electrode 40). The thermally conductive element 154 facilitates achieving a selected difference in the temperatures of the optical waveguide lengths (or portions thereof) 28 20 and 30.

The widened portion 215 of the region 204 includes tail portions 212 and 214. The presence of the center electrode is considered to be slightly detrimental, in that the widened region 215 is wider when a center electrode 34 is present, such that the tail 214 is pushed farther to the right in FIG. 8. The center electrode 34 provides a thermal short between optical waveguide lengths 28 and 30, lowering the temperature difference therebetween.

Figure 9:
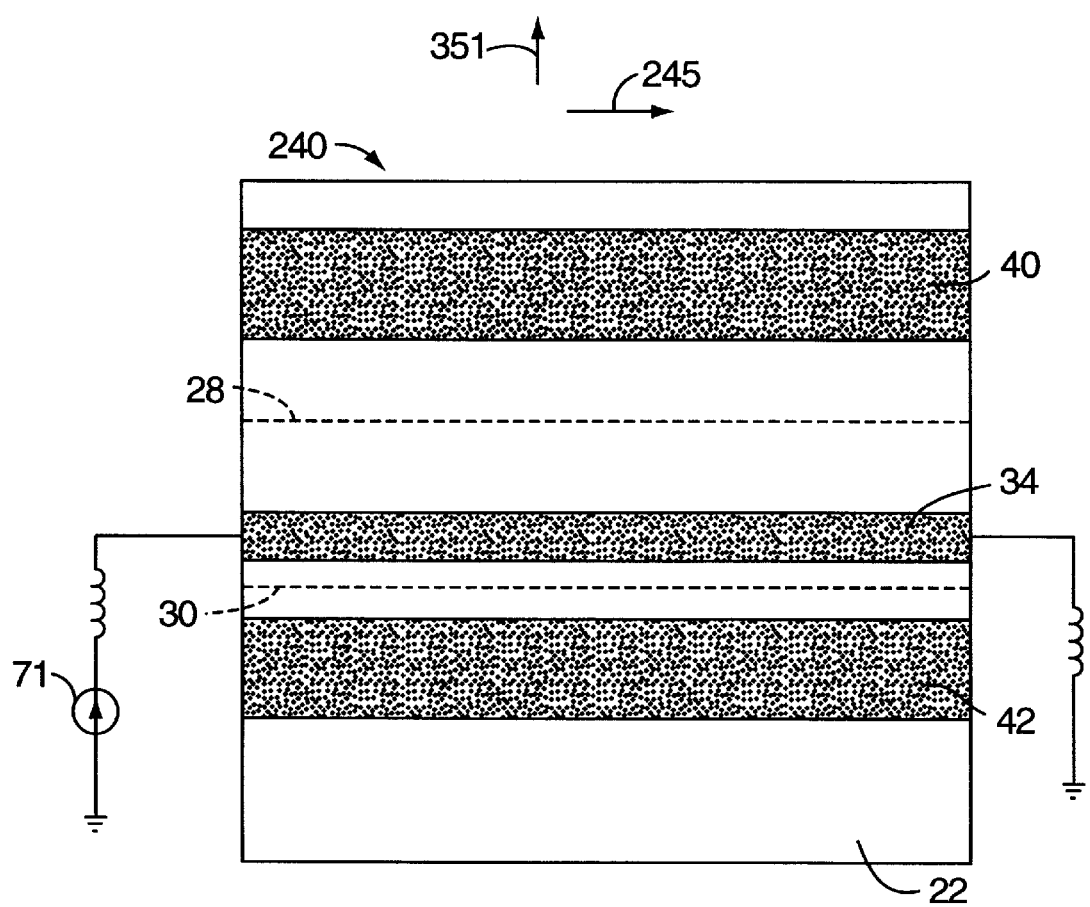
FIG. 9 illustrates apparatus according to the invention including a asymmetric coplanar waveguide (ACPW) electrode structure.

FIG. 9 shows an alternative embodiment 240 of the invention wherein an Asymmetrical Coplanar Waveguide (ACPW) structure having a center electrode 34 that is asymmetrically located with respect to the ground electrodes 40 and 42. As shown in FIG. 8, the ACPW center electrode 34 is farther from the upper ground electrode 40 than from the lower ground electrode 42. Because the center electrode is asymmetrically positioned relative to the optical waveguide lengths 28 and 30, providing heater current to the center electrode 34 asymmetrically transfers thermal energy with the optical waveguide lengths 28 and 30. Accordingly, the optical waveguide lengths reach different temperatures. ACPW can be used in an interferometric application.

Figure 10:
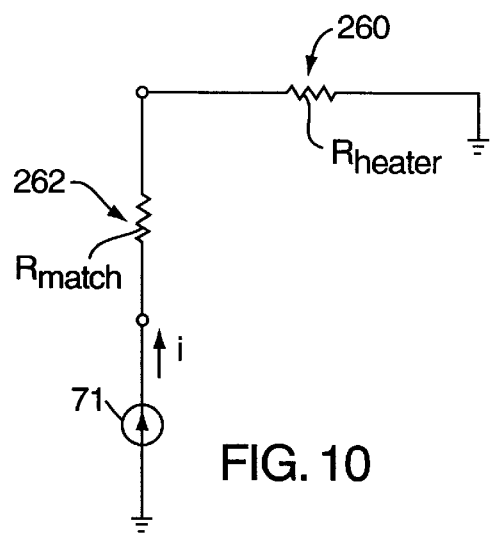
FIG. 10 illustrates the use of a matching resistor with the heater electrode of the present invention.

As shown in FIG. 10, a matching resistor 262 is preferably included for matching the heater electrode 54A (or 54B), represented by an equivalent heater electrode resistance 260, and the current supply 71. The matching resistor 262 is preferably of a resistance approximately equal to the average value, over temperature, of the equivalent resistance 260 of the heater electrode. Although matching resistors are known in the art, they are typically not used when powering a heater electrode from a current supply, as the matching resistor consumes as much power as the heater electrode and hence the overall power that must be supplied by the current supply is increased. However, the use of the matching resistor 262 significantly reduces the sensitivity of the power transfer between the current supply 71 and the heater electrode due to variations in the resistance of the heater electrode equivalent resistance 260, and hence helps stabilize the current supplied to the heater electrode.

Figure 11:
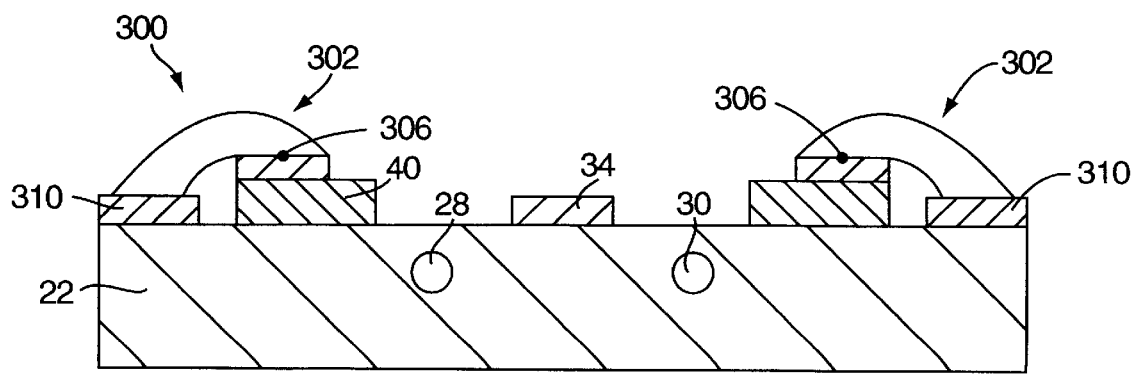
FIG. 11 illustrates an embodiment of the invention using a thermoelectric cooler.

The prior discussion has focused on the use of heater electrodes for asymmetrically transferring thermal energy with the optical waveguide lengths 28 and 30 for obtaining a selected difference in the temperatures of the optical waveguide lengths 28 and 30. However, devices such as the thermoelectric coolers 302 shown in FIG. 10 can also asymmetrically transfer thermal energy with the optical waveguide lengths 28 and 30, as shown in FIG. 11. A CPW electrode structure, having a center electrode 34 and ground electrodes 40 and 42, and disposed with an electrooptic substrate 22, is shown in cross section in FIG. 11. The thermoelectric coolers 302 include semiconductor junctions 306 for selectively cooling the ground electrodes 40 and 42 and transferring heat to thermal conductors 310. The thermal conductors 310 facilitate heat transfer to the ambient environment or to the substrate 22. The term "transferring thermal energy with," as used herein, is intended to include both transferring thermal energy to, as well as removing thermal energy from, an entity, such as an optical waveguide length.

Figures 12A, 12B:
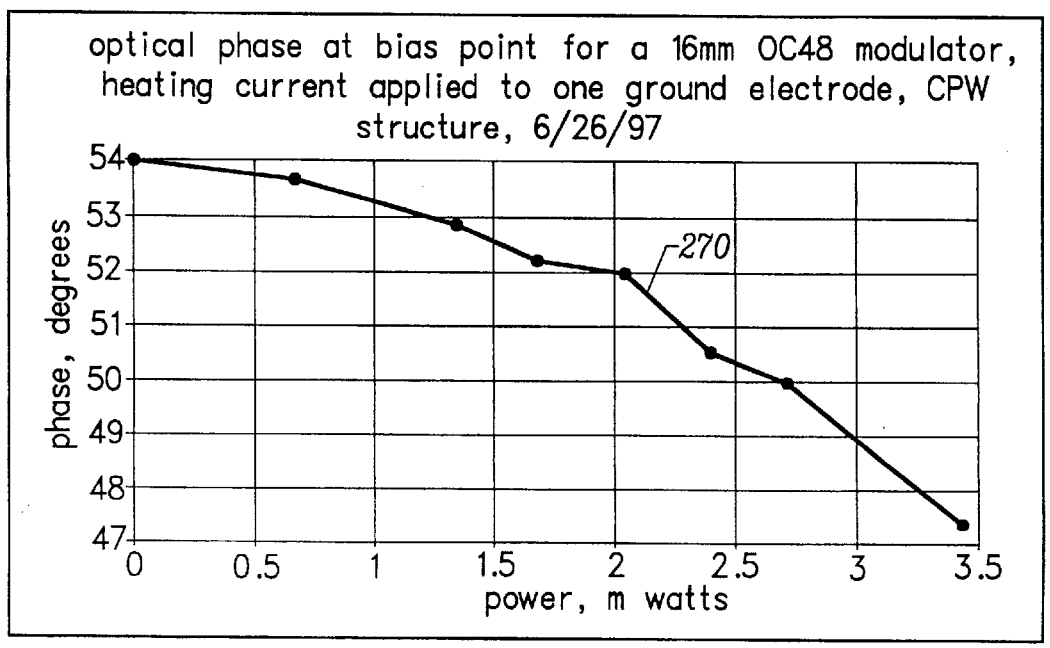
FIGS. 12A and 12B illustrate, respectively, a table and plot of experimental results demonstrating variation of the bias point of an optical modulator in accordance with the present invention.

Shown in FIGS. 12A and 12B are experimental results demonstrating thermal tuning of the bias point of the embodiment of the invention shown in FIG. 3, a monolithic optical modulator having a interferometer optical waveguide structure 21 and a CPW electrode structure having a center electrode 34 and ground electrodes 40 and 42. The table of FIG. 12A includes entries for heating current supplied to the ground electrode 42 by current supply 71, for the overall heating power supplied to the ground electrode 42, and for the optical phase of the output beam propagating along the output waveguide length 33. The voltages applied to the ground electrode 42 range from approximately 0 to approximately 0.02 volts, well within the range of voltage (15 v) typically available in optical systems. At 200 mA of heater electrode current, 17 millivolts of drop occurred down the RF ground electrode, translating into 3.4 milliwatts for a change of 6.7 degrees of optical phase, or 1.97 degrees/ milliwatt. This scale factor, of course, is dependent on the electrode geometry, since the temperature differential between the two optical waveguide lengths 28 and 30 depends on a variety of factors. Significantly, no drift in the output phase, and hence in the bias point, was observed. FIG. 12B is a plot of the optical phase entry versus the power entry of the table of FIG. 12A.

Figure 13A:
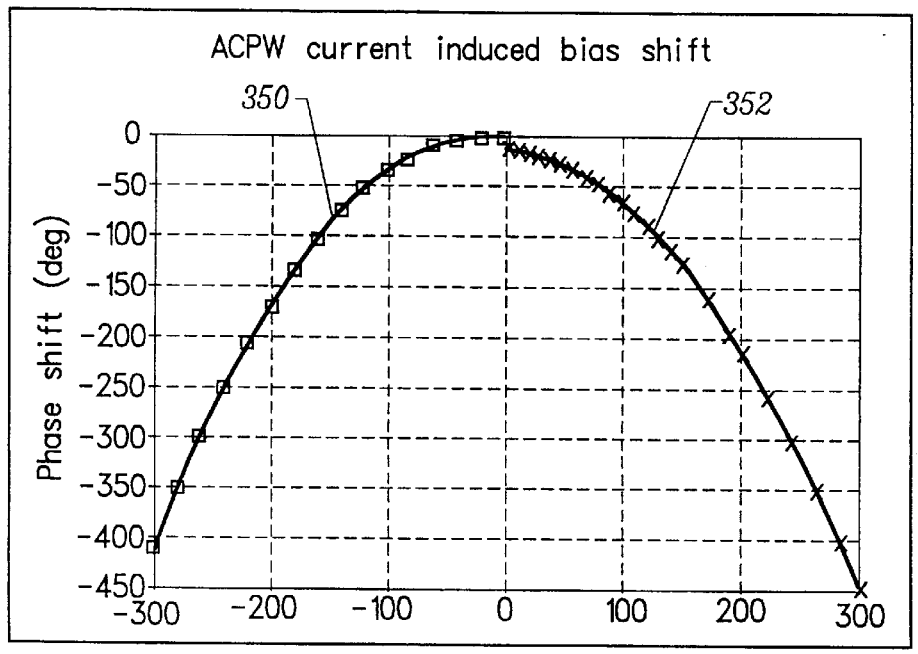
FIGS. 13A and 13B are plots of experimental result of varying the bias point of a modulator having an ACPW electrode structure.
Figure 13B:
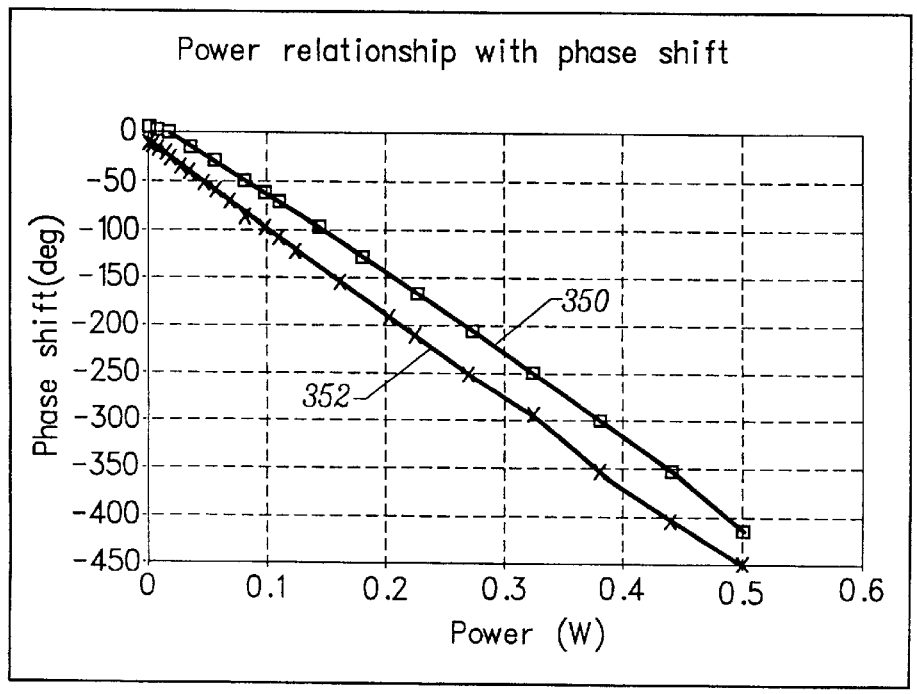

Shown in FIGS. 13A and 13B are the results of an experiment conducted on a modulator that included an ACPW structure, similar to the ACPW electrode structure illustrated in FIG. 9, in which the center electrode is asymmetrically located with respect to the optical waveguide lengths, but having only one ground electrode. The heating current provided to the center electrode asymmetrically transfers thermal energy with the optical waveguide lengths for providing a difference in the temperature thereof. Optical phase versus heating current was measured, and the change in optical phase was well behaved, though the results indicated that the device was not as efficient in terms of the phase change per power as the experiment of FIGS. 12A and 12B. Some voltage-field induced phase change was observed, because of the small voltage between the center electrode and the ground electrode induced by the heating current in the center electrode. This is seen as a difference between the positive and negative current vs. phase plots, since the $i^2R$ heating term always has a positive sign, and the voltage induced change can have a bipolar sign. This is not seen as a problem for geometries designed to keep the voltages low across the waveguide, such as a "guard" ground path.

The plot shown in FIG. 13A is of a parabolic nature, because although the temperature differential and change in index of refraction of an optical waveguide length are considered predominantly linear functions, the heat energy dissipated in the heater electrode goes as $i^2R$, where i is the current in the heater electrode and R is the resistance of the heater electrode. Plotting the curves as a function of thermal energy dissipated reveals the more linear relationship shown in FIG. 13B. An average sensitivity of 0.9 degrees of optical phase per milliwatt is calculated by averaging the two curves 350 and 352 of FIG. 13B.

The phase change in an optical waveguide length, such as the optical waveguide length 30 illustrated in FIG. 6F, can be estimated as follows. Using lithium niobate as an example, the index of refraction of lithium niobate as a function of temperature is reported, for a wavelength of light of 1.6 microns, as changing from 2.1351 at 25 degrees C to 2.1372 at 80 degrees C., yielding an average slope of $38.18 \times 10^{-6}$ per degree C. At a wavelength of 1.4 microns, over the same temperature range, the index of refraction varies from 2.1410 to 2.1426, yielding an average slope of $29.0 \times 10^{-6}$ per degree C. For a given change in the temperature of the optical waveguide length 30 having a length L, the change in the phase of an optical beam propagating thereon is estimated by $$\text{phase change(degrees)} = (360) \times (\text{avg. slope}) \times (\text{temperature change}) L / \lambda_0$$

For a length L of 16 mm, a typical length used in practice, a phase change of 180 degrees can be realized by a temperature change of 1.4 degrees C. This is a small temperature variation, and well within a range over which a plot of the index of refraction of the lithium niobate vs. temperature can be approximated as linear. The above equation applies also to a modulator, such as the modulator 21 of FIG. 1, where the optical waveguide lengths 28 and 30 are of equal lengths L, and "temperature change" refers to the difference in temperature between the optical waveguide lengths, and the phase change is the phase differential between beam propagating along the optical waveguide lengths 28 and 30. A 180 degree phase differential can reduce intensity of the output of the modulator 21 to zero, as the beam add destructively at the junction 32. The temperature of a given length is assumed to be constant along that length. As understood by one of ordinary skill, in light of the disclosure herein, it is possible to heat only a portion of the optical waveguide length 30, which case the L in the above equation refers to the length of the heated portion.

As is known to one ordinary skill lithium niobate has a so called extraordinary axis. Because the temperature sensitivity of the index of refraction of an electrooptic material is greater along the extraordinary axis, it is preferable that the substrate be oriented such that the extraordinary axis of the substrate is parallel to the direction of polarization of light, that is, the extraordinary axis preferably lay in the direction indicated by the reference numeral 350 in the accompanying FIGURES, often referred to as the Z-axis direction of substrate.

It is thus seen that the object set forth above, as well as those made apparent from the preceding description, are officially attained. Because certain changes may be made in the above constructions without departing from the scope of the invention, it is intended that all matter contained in the above description be considered as illustrative and not as limiting. For example, heaters or coolers for transferring thermal energy with an optical waveguide length or for asymmetrically transferring thermal energy with two or more optical waveguide lengths for providing a selected difference in the temperatures thereof need not be disposed with the substrate, but can, for example, be separate from the substrate and appropriately thermally coupled to the optical waveguide length(s). However, disposition of a heater or cooler with the substrate is preferred. Furthermore, the heater current need not be a steady state current. As understood by one of ordinary skill, in light of the disclosure herein, an alternating heater current will also serve to dissipate thermal energy in the heater electrodes.

It is also understood that the following claims are intended to cover all generic and specific features of the invention described herein, and all statements of scope of the invention which as a matter of language might be said to fall therebetween.

Having described the invention, what we claim as secured by Letters Patent is:

1. An optical modulator, comprising
    an electrooptic substrate;
    an optical waveguide interferometer disposed with said electrooptic substrate and including first and second optical waveguide lengths for propagating optical beams for interfering to form an output beam;
    an electrode structure disposed with said substrate and having a center electrode and first and second ground electrodes, said electrode structure for exposing said optical waveguide lengths to time-varying electric fields produced between said center and ground electrodes for modulating the output beam; and
    means for providing a selected temperature difference between the temperature of at least a portion of said first optical waveguide length and the temperature of at least a portion of said second optical waveguide length for providing a selected bias point for operation of the modulator.

2. The apparatus of claim 1 wherein said means for providing a selected temperature difference includes a current supply in electrical communication with one of said electrodes for providing a heating current thereto.

3. The apparatus of claim 2 including a matching resistor electrically connected with said current supply and said one of said electrodes.

4. The apparatus of claim 2 wherein said current supply is in electrical communication with one of said ground electrodes.

5. The apparatus of claim 1 wherein said means for providing a selected temperature difference includes a heater electrode disposed with said substrate.

6. The apparatus of claim 5 wherein said heater electrode is an electrode disposed adjacent a first of said ground electrodes such that said first ground electrode is between said heater electrode and said optical waveguide lengths, at least a portion of said heater electrode being spaced from said first ground electrode by a gap less than approximately 20 microns.

7. The apparatus of claim 6 wherein said heater electrode has a thickness of less than approximately 1 micron.

8. The apparatus of claim 6 including a second heater electrode disposed with said substrate adjacent said other ground electrode such said other ground electrode is between said second heater electrode and said optical waveguide lengths, at least a portion of said second heater electrode being spaced from said other ground plane by a gap of less than approximately 20 microns.

9. The apparatus of claim 6 wherein said heater electrodes have a width of less than approximately 100 microns and a thickness of between approximately 1 micron and approximately 1000 Angstroms.

10. The apparatus of claim 6 wherein said other ground electrode functions as a heat spreader for increasing the temperature difference between said optical waveguide lengths.

11. The apparatus of claim 8 including a steering circuit including two non-reciprocal devices for steering heater current to one of said heater electrodes and not to the other of said heater electrodes based on the polarity of the voltage associated with the heater current.

12. The apparatus of claim 2 including a combined input circuit for providing a single input for receiving a time varying signal and said heater current and for directing the time varying signal to said center and ground electrodes for producing the time-varying electric fields therebetween and the heater current to said one of said electrodes.

13. An optical device comprising:
an electrooptic substrate including first and second optical waveguide lengths disposed with said substrate, said optical waveguide lengths for propagating first and second beams;
means for asymmetrically transferring thermal energy with said first and second optical waveguides for providing a selected difference in temperature between at least a portion of said first optical waveguide length and a portion of said second optical waveguide length for providing one of a selected phase difference and a selected intensity difference between the first and second beams.

14. The apparatus of claim 13 including a thermally conductive element disposed with said substrate and adjacent one of said first and second optical waveguide lengths for enhancing said difference in temperature.

15. The apparatus of claim 14 wherein said means for asymmetrically transferring thermal energy includes a heater electrode disposed with said substrate and adjacent the other of said optical waveguide lengths.

16. The apparatus of claim 13 wherein said means for asymmetrically transferring thermal energy includes a heater electrode disposed with said substrate.

17. The apparatus of claim 14 including first and second thermally conductive elements disposed with said substrate for enhancing said difference in temperature, said first and second thermally conductive elements adjacent first and second, respectively, of said optical waveguide lengths, the apparatus further including first and second heater electrodes disposed with said substrate and adjacent said first and second thermally conductive elements, respectively, such that said thermally conductive elements and said optical conductors are between said heater electrodes.

18. A electrooptic device for receiving an optical input beam and for providing stable control of the phase and/or the intensity of an optical output beam, comprising:
an electrooptic substrate;
an optical waveguide structure disposed with said substrate and forming an interferometer for receiving the input beam and including first and second optical waveguide lengths for propagating beams for interfering to form the output beam; and
at least a first heater for providing a selected difference in the temperature of at least a portion of said first optical waveguide length and at least a portion of said second optical waveguide length for controlling the phase and/or the intensity of the output beam.

19. The apparatus of claim 18 wherein said first heater is a heater electrode disposed with said substrate and wherein said apparatus includes a second heater electrode disposed with said substrate, said first heater being nearer said first optical waveguide length than said second heater and said second heater being nearer said second optical waveguide length than said first heater.

20. The apparatus of claim 18 including at least one current supply for providing a heating current to at least one of said heaters.

21. The apparatus of claim 18 including means forming an electrode structure disposed with said substrate to expose said optical waveguide structure to time varying electric fields to modulate an optical output beam.

22. The apparatus of claim 18 wherein said heater electrode is disposed along a length of one of said first and second optical waveguides, and wherein said apparatus further includes a thermally conductive element disposed with said substrate and extending along a length of the other of said first and second optical waveguides, said thermally conductive element for enhancing said difference in the temperature of said first and second optical waveguides.

23. An optical device for providing stable control of the phase or intensity of an optical beam, comprising:
an electrooptic substrate;
an optical waveguide length disposed with said substrate and for propagating the optical beam;
means for transferring thermal energy with said optical waveguide length for one of heating and cooling said waveguide length for varying one of the phase and intensity of an optical beam propagating therealong, whereby said phase and intensity are substantially drift free.

24. The apparatus of claim 23 wherein said means for transferring thermal energy includes one of: a heater electrode disposed with said substrate; and a thermoelectric cooler disposed with said substrate.

25. The apparatus of claim 23 wherein said means for transferring thermal energy includes an electrode disposed with said substrate for conducting a heating current for transferring thermal energy with said optical waveguide length for varying the one of the phase and the intensity of the optical beam.

26. The apparatus of claim 25 including a second optical waveguide length disposed with the substrate for propagating a second optical beam, and wherein said electrode is disposed for asymmetrically transferring thermal energy with said optical waveguides for providing a difference in the temperatures thereof to provide a selected phase difference between optical beams propagating along said waveguide lengths.

27. The apparatus of claim 26 including second and third electrodes disposed with said substrate and forming with said electrode a coplanar waveguide electrode structure for applying time-varying electric fields to said first and second optical waveguide lengths for modulating an output beam formed by the interference of optical beams propagating along said first and second waveguide lengths.

28. The apparatus of claim 26 wherein said second optical waveguide length is disposed between said electrode and said optical waveguide length.

29. The apparatus of claim 26 wherein said optical waveguide lengths are substantially parallel, said apparatus including first and second thermally conductive elements disposed with said substrate such that said optical waveguide lengths are between said first and second thermally conductive elements, said apparatus also including a second heater electrode disposed with said substrate, said thermally conductive elements and said optical waveguide lengths disposed between said heater electrodes.

30. The apparatus of claim 27 including a center electrode disposed between said optical waveguides, and wherein said thermally conductive elements form with said center electrode a coplanar waveguide electrode structure for exposing said optical waveguide lengths to time varying electric fields.

31. The apparatus of claim 25 including at least a second electrode disposed with said electrode for forming therewith an electrode structure for exposing said optical waveguide length to a time varying electric field for modulating the beam propagating along said optical waveguide length.

32. The apparatus of claim 25 wherein said electrode has a resistance of between approximately 300 and 2000 ohms.

33. A monolithic electrooptic optical modulator and signal conditioner, comprising:

an electrooptic substrate;

a first optical waveguide structure disposed with said substrate and forming an interferometer for receiving an input beam and including first and second optical waveguide lengths for propagating beams for interfering to form a conditioned output beam;

at least a first heater electrode disposed with said substrate for providing a selected difference in the temperature of at least a portion of said first optical waveguide length and at least a portion of said second optical waveguide length for controlling the phase and/or the intensity of the conditioned output beam;

a second optical waveguide structure disposed with said substrate and forming an interferometer including third and fourth optical waveguide lengths for propagating beams for interfering to form a modulated beam, said second optical waveguide structure in optical communication with said first optical waveguide structure; and at least one electrode disposed with said substrate for exposing at least one of said third and fourth waveguide lengths to a time-varying electric field for providing the modulation of the modulated output beam.

34. The apparatus of claim 33 wherein said first optical waveguide structure receives as the input beam the modulated output beam of the second optical waveguide structure.

35. The apparatus of claim 33 wherein said second optical waveguide structure receives as an input beam the output beam from said first optical waveguide structure.

36. A method of biasing the output beam of an electrooptic modulator to a selected phase or intensity, the modulator having at least first and second optical waveguide lengths disposed with an electrooptic substrate for propagating light beams for interference to form the output beam, comprising:

selecting a bias point for operation of the modulator;

selecting a temperature difference to achieve the selected bias point; and providing approximately the selected difference between the temperature of at least a portion of the first optical waveguide length and the temperature of at least a portion of the second optical waveguide length to achieve the selected bias point.

37. The method of claim 36 wherein the step of providing approximately the selected temperature difference includes providing a heating current to an electrode disposed with said substrate.

38. The method of claim 37 wherein the step of providing the selected difference in temperature includes the step of enhancing the temperature difference between said first and second optical waveguide lengths using a thermally conductive element disposed with the substrate and asymmetrically located with respect to the first and second optical waveguide lengths.

39. The method of claim 38 wherein the step of providing the selected difference in temperature includes using the thermally conductive element that is disposed so as to form a gap with one of said optical waveguide lengths of less than approximately 20 microns.

40. The method of claim 37 wherein the step of providing a heating current through an electrode includes the step of providing the heating current through an electrode that provides a time varying electrical field for modulating the output beam.

41. The method of claim 37 wherein the step of providing a heating current includes providing a heating current through an electrode of a coplanar waveguide electrode structure disposed with the substrate.

42. The method of claim 41 including the step of providing a time varying signal to the coplanar waveguide electrode structure for exposing at least one of said optical waveguide lengths to a time varying electric field for modulating the output beam of the modulator, the time varying signal and the heating current signal being provided to said modulator a single input of a combined signal input circuit.

43. The method of claim 37 wherein the step of providing a heating current includes providing a heating current through a ground electrode of a coplanar waveguide electrode structure disposed with substrate.

44. The method of claim 37 wherein the step of providing a heating current includes providing the heating current to the electrode via a heating current steering circuit including first and second non-reciprocal devices.

45. The method of claim 36 wherein the step of providing approximately the selected temperature difference includes thermoelectrically cooling with a thermoelectric cooler disposed with said substrate an electrode disposed with the substrate for asymmetrically transferring thermal energy with said first and second optical waveguide lengths.

46. A method for providing stable control of an optical beam propagating along an optical waveguide length, comprising the steps of:

selecting one of the desired phase and the desired intensity of the optical beam;

selecting a temperature to achieve the selected one of the phase and the intensity; and transferring thermal energy with said optical waveguide length for maintaining the optical waveguide length at approximately the selected temperature whereby the selected one of the phase and the intensity is substantially drift free.

47. The method of claim 46 further including the step of refraining from applying a d.c. voltage to the optical waveguide length.

* * * * *

UNITED STATES PATENT AND TRADEMARK OFFICE
CERTIFICATE OF CORRECTION

PATENT NO.     : 6,181,456B1
DATED          : January 30, 2001
INVENTOR(S)    : Gregory J. McBrien; Karl Kissa; Daniel J. Fritz It is certified that error appears in the above-identified patent and that said Letters Patent is hereby corrected as shown below:

Specification:

Column 13,
Line 60, after "index of refraction", delete "of an electrooptic material".

Claim 10, column 15,
Line 9, after "wherein said", plese delete "other";
Line 10, change "electrode" to -- electrodes --; and change "functions" to -- function --.

Signed and Sealed this

Thirty-first Day of July, 2001

Attest:

NICHOLAS P. GODICI
Attesting Officer    Acting Director of the United States Patent and Trademark Office